Patented May 30, 1950

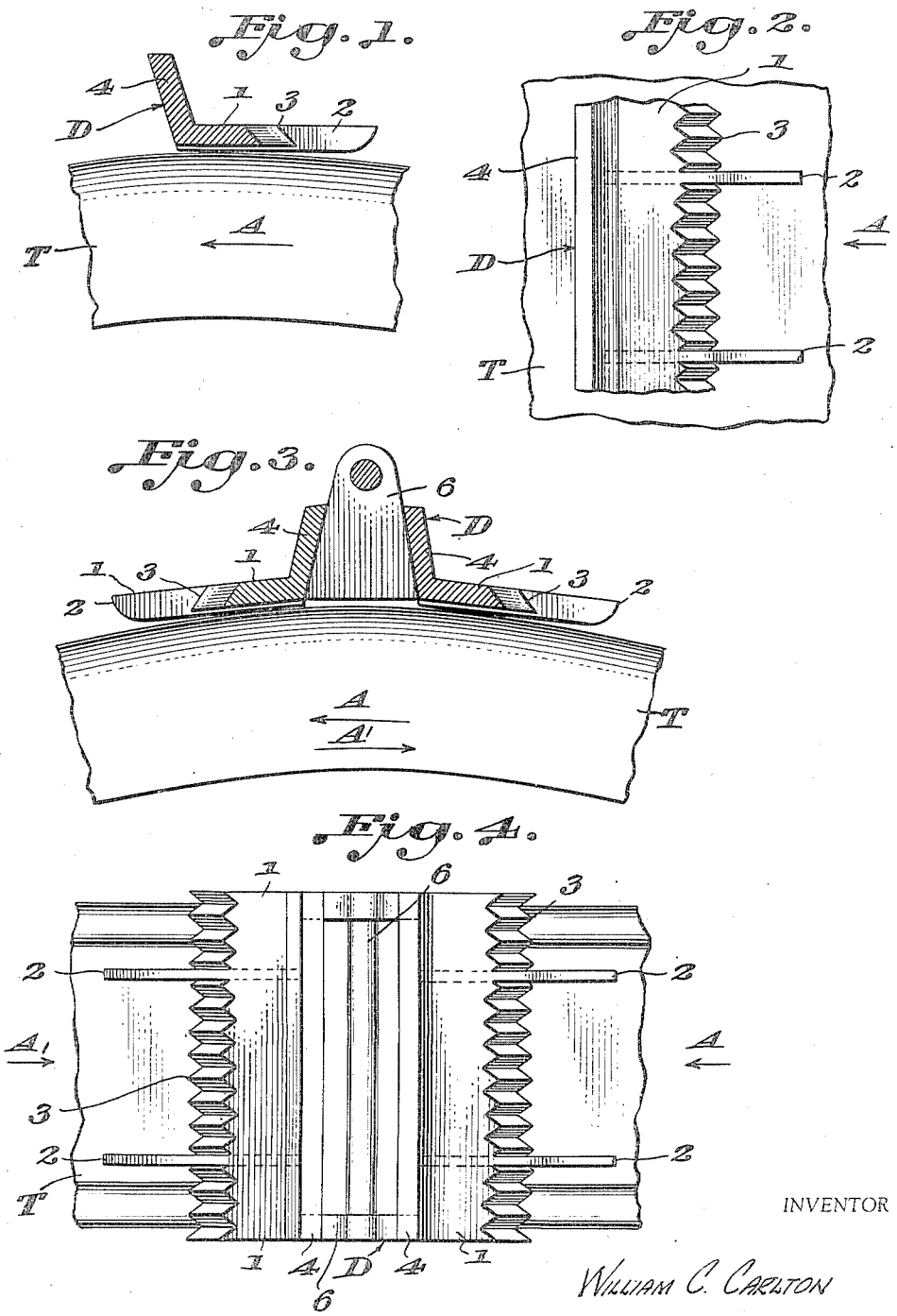

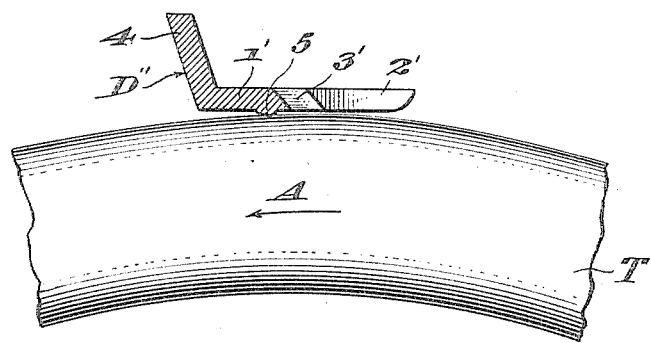
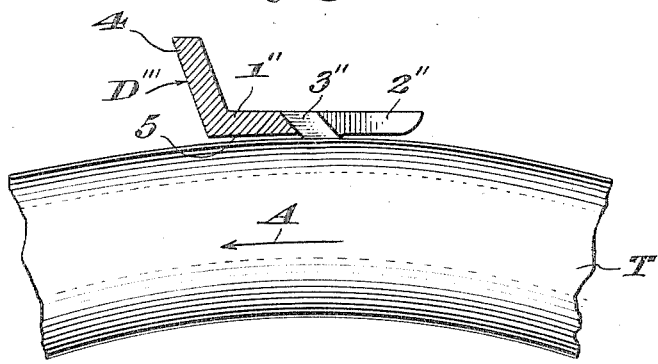

2,509,807

UNITED STATES PATENT OFFICE 2,509,807

DEVICE FOR PROTECTING VEHICLE TIRES

William Charles Carlton, Hornchurch, England

Application April 23, 1948, Serial No. 22,768
In Great Britain January 8, 1946

4 Claims. (Cl. 280—158)

The present invention relates to devices for protecting and preserving the tyres of power driven vehicles and other wheeled vehicles, and is applicable with particular advantage to the protection and preservation of tyres of rubber, or other resilient substances, such as are usually applied to automobiles, motor trucks, motor omnibuses, bicycles, and other road vehicles and aircraft.

In order to maintain the tyres of vehicles in good condition, and to obtain the maximum length of service therefrom, it is necessary as far as possible to prevent any nails or other sharp metallic objects, flints, stones, or other foreign bodies from adhering to, and becoming embedded in, the tyre surfaces, and for this purpose it has previously been proposed to provide mechanical devices for deflecting or extracting from the tyre surfaces such bodies which have collected thereon, so as to prevent the said bodies from subsequently becoming embedded in the tyre.

For example, in my prior British patent specification No. 578,851 which corresponds to my U. S. Patent No. 2,407,473 and in the specification of my co-pending United States patent application Serial No. 695,321 filed September 6th, 1946, among others, I have described various devices for protecting and preserving tyres, which devices in all cases embody tyre-clearing means in the form of extractor or deflector blades adapted to be set across the tyre surface which it is desired to protect and yieldingly maintained in operative relation thereto.

The primary object of the present invention is to provide modified and improved tyre-clearing means for use with tyre protecting or preserving devices such as those referred to above and to this end, according to the present invention, provision is made of an extractor or deflector blade or bar having outrigger or skid means extending outwards from the blade or bar and adapted to ride upon or make contact with the tyre surface in front of the said leading edge of the blade or bar for the purpose hereinafter set forth.

In order that the invention may be clearly understood and readily carried into effect, practical embodiments thereof will now be described by way of example and with reference to the accompanying drawings in which:

Fig. 1 is a sectional, side elevation of the tyre-clearing extractor or deflector means of a tyre protecting or preserving device embodying the present invention;

Fig. 2 is a fragmentary plan view of the extractor or deflector means shown in Fig. 1.

Fig. 3 is a sectional side elevation of an alternative arrangement of extractor or deflector means embodying the invention;

Fig. 4 is a fragmentary plan view thereof;

Figs. 5 and 6 are fragmentary sectional side elevations of further alternative forms of the extractor or deflector means embodying the invention.

Referring to the drawings, D, D', D'' and D''' indicate alternative forms of extractor or deflector means of a tyre protecting and preserving device and T the tyre to which the device is applied.

Referring to Figs. 1–4, 1 indicates an exterior or deflector blade which is shown by way of example in the form described and claimed in my co-pending application Serial No. 717,018, filed December 18th, 1946, now Patent No. 2,501,886, granted March 28, 1950, of which the present application is a continuation-in-part. The serrated blade 1, in the form shown, is not an essential part of the present invention and other forms of extractor or deflector blades or clearing bar means may be used if desired.

Outrigger or skid means 2 extend outwards from the operative or leading serrated edge 3 of each blade 1. By "operative or leading edge" is meant that edge or portion of the blade with which the foreign bodies carried by the tyre will come into contact. In the forms shown, each outrigger or skid 2 comprises an elongated bladelike member which is formed integral with or secured to the serrated edge 3 of the extractor or deflector blade 1 with which it is associated, and arranged so to make edgewise contact with the tyre surface. The elongated blade-like skid members are preferably arranged, as shown, so as to extend substantially parallel to the direction of movement of the tyre surface. The contact edges of the outriggers or skids 2 project from the inner or undersurface of the blade 1, as shown in Figs. 1 and 3.

Alternatively, as shown in Fig. 5, the blade 1' is provided with outriggers or skids 2' arranged so that the contact edges thereof are flush with the inner or undersurface of the blade 1'.

Again alternatively, as shown in Fig 6, the blade 1'' is provided with outriggers or skids 2'' which are slightly inset from the inner or undersurface of the serrated leading edge 3'' of the blade 1'' and the said leading edge 3'' is permitted to contact the tyre surface.

In each of the forms of the invention shown in the drawings, pair of outriggers or skids 2, 2' or 2'' disposed in spaced relation across the surface of the tyre T, are associated with each blade 1, 1', or 1'', but more than two outriggers or skids distributed in spaced relation across the tyre surface or, if desired, only one such member, may be used with each blade.

The blades, 1, 1', or 1'' may, with advantage, be set in relation to the tyre T so that the inner or undersurface of the blade is substantially parallel to the adjacent part of the tyre surface protected thereby.

As shown in Figs. 1 and 2, the extractor or deflector means D may present a single operative or leading edge 3 from which the outriggers 2 project outwards in a direction opposite to the direction of movement of the tyre T, as indicated by the arrow A. Alternatively, as shown in Figs. 3 and 4, the extractor or deflector means may present oppositely facing operative edges 3 each of which becomes the leading and trailing edge in turn, as the rotation of the tyre is reversed as indicated by the arrows A and A1. Thus, the outriggers or skids 2 of the arrangement shown in Figs. 3 and 4 extend in opposite directions i. e. in both directions of rotary movement of the tyre surface and are adapted to contact the tyre surface in advance of the leading edge and in the rear of the trailing edge of the device D' respectively.

The extractor or deflector means constructed as above described may readily be incorporated in the device described and illustrated in my prior British patent specification No. 578,851 and, to this end, each blade 1 may be provided, as shown in the drawing with a bracket part 4 set at an angle to the blade 1 to serve for mounting the blade and associated skid or outrigger means upon a transverse support 6 for example as shown in Fig. 4 and more particularly described in the above numbered specification.

Alternatively, the extractor or deflector means D or D' may be mounted in other ways and in this case the blade 1 need not be provided with an angle bracket 4 as above described but may be made as a blade portion 1 carrying outrigger or skid means 2, and adapted to be supported at one or more points along its length by means which yieldingly maintain the contact surfaces of the blade and outrigger or skid means in spaced relation to or contact with the tyre surface and permit the said device to move towards or away from the said tyre surface. Such supporting means may for example be of the form disclosed in my co-pending United States patent application Serial No. 695,321 referred to above. Furthermore and particularly when the contact edges of the outrigger or skid means 2' are flush with the inner or under edges of the blade 1', as shown in the device D'' of Fig. 5, a continuous ridge or a row of projections 5, may be provided upon the under or inner surface of the blade 1', so as to extend across it in a direction transverse to the direction of rotation of the tyre. The ridge or projections preferably just touch the surface of the tyre, as shown, when the blade is mounted in operative position.

In the device D''' as shown in Fig. 6, the under or inner side of the blade 1'' is made slightly concave or hollow at 5', which concavity extends across the blade in a direction transverse to the direction of rotation of the tyre. Thus, the serrated operative or leading edge 3'' of the blade 1'' is adapted to project slightly outwards beyond the contact edge of the outriggers or skids 2'' and the concave surface 5' so as to contact the tyre surface in advance of the outriggers or skids 2'' as shown. In this form of the invention the tyre-contacting surfaces of the operative leading edge of the blade 1'' and the contact edges of the outriggers or skids 2'' are made concave so as substantially to conform to the curvature of the tyre surface to which the device is applied.

It will readily be appreciated that the outrigger or skid means and/or projections described above will assist the extractor or tyre-clearing deflector means equipped herewith to ride over the tyre surface and will also assist in maintaining the said tyre-clearing means in predetermined operative relation to said tyre surface.

I claim:

1. A clearing device for protecting tires of vehicle wheels comprising a blade member positioned to extend transversely of the outer periphery of a tire and having a proximate surface adapted to lie in close proximity to the outer peripheral surface of the tire, and a transverse edge portion positioned to be first engaged by elements picked up by the tire, and skid means projecting from the edge of said blade in a direction substantially tangentially of the circumference of the tire to engage the circumferential surface of the tire and prevent digging of said edge into the tire surface.

2. A clearing device for protecting tires of vehicle wheels comprising a blade member positioned to extend transversely of the outer periphery of a tire and having a proximate surface adapted to lie in close proximity to the outer peripheral surface of the tire, and a transverse edge portion positioned to be first engaged by elements picked up by the tire, and skid means projecting from the edge of said blade in a direction substantially tangentially of the circumference of the tire to engage the circumferential surface of the tire and prevent digging of said edge into the tire surface, said skids having tire engaging portions in closer proximity to the tire surface than the edge of said blade.

3. A clearing device for protecting tires of vehicle wheels comprising a blade member positioned to extend transversely of the outer periphery of a tire and having a proximate surface adapted to lie in close proximity to the outer peripheral surface of the tire, and a transverse edge portion positioned to be first engaged by elements picked up by the tire, and skid means projecting from the edge of said blade in a direction substantially tangentially of the circumference of the tire to engage the circumferential surface of the tire and prevent digging of said edge into the tire surface, said skids having its tire engaging portion more remote from the tire surface than the edge of said blade.

4. An extractor or deflector device for protecting tires of vehicle wheels comprising a blade having an operative edge portion adapted to lie in close proximity to the outer peripheral surface of a tire and positioned to be first engaged by elements picked up by the tire, and skid means carried by the blade and adapted to ride upon the tire surface, said skid means extending in a radial direction nearer to the center of the wheel carrying the tire to be protected than the portion of the operative edge of the blade which is adjacent to the respective skid means.

WILLIAM CHARLES CARLTON.

REFERENCES CITED

The following references are of record in the file of this patent:

UNITED STATES PATENTS

| Number | Name | Date |
|---|---|---|
| 841,958 | Frommater | Jan. 22, 1907 |
| 2,277,528 | Osborn | Mar. 24, 1942 |
| 2,435,009 | Kief | Jan. 27, 1948 |